April 19, 1949. O. C. WILSON ET AL 2,467,642
METHOD FOR COATING ARTICLES
WITH PLASTIC MATERIAL
Filed April 12, 1945 2 Sheets-Sheet 1
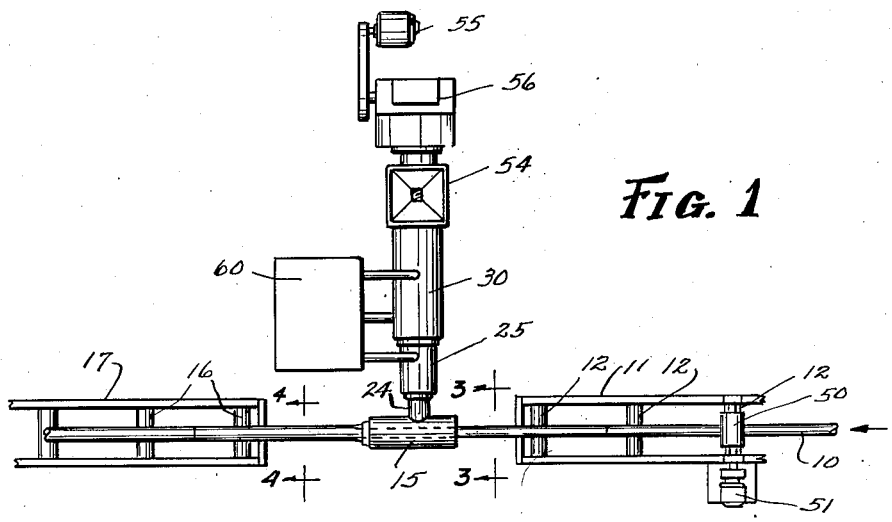
Fig. 1
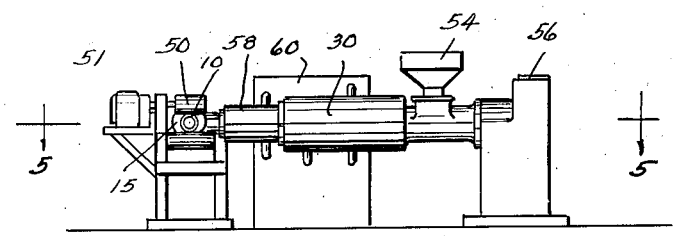
Fig. 2
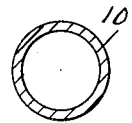
Fig. 3
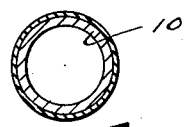
Fig. 4

April 19, 1949.
O. C. WILSON ET AL
2,467,642
METHOD FOR COATING ARTICLES WITH PLASTIC MATERIAL
Filed April 12, 1945
2 Sheets-Sheet 2
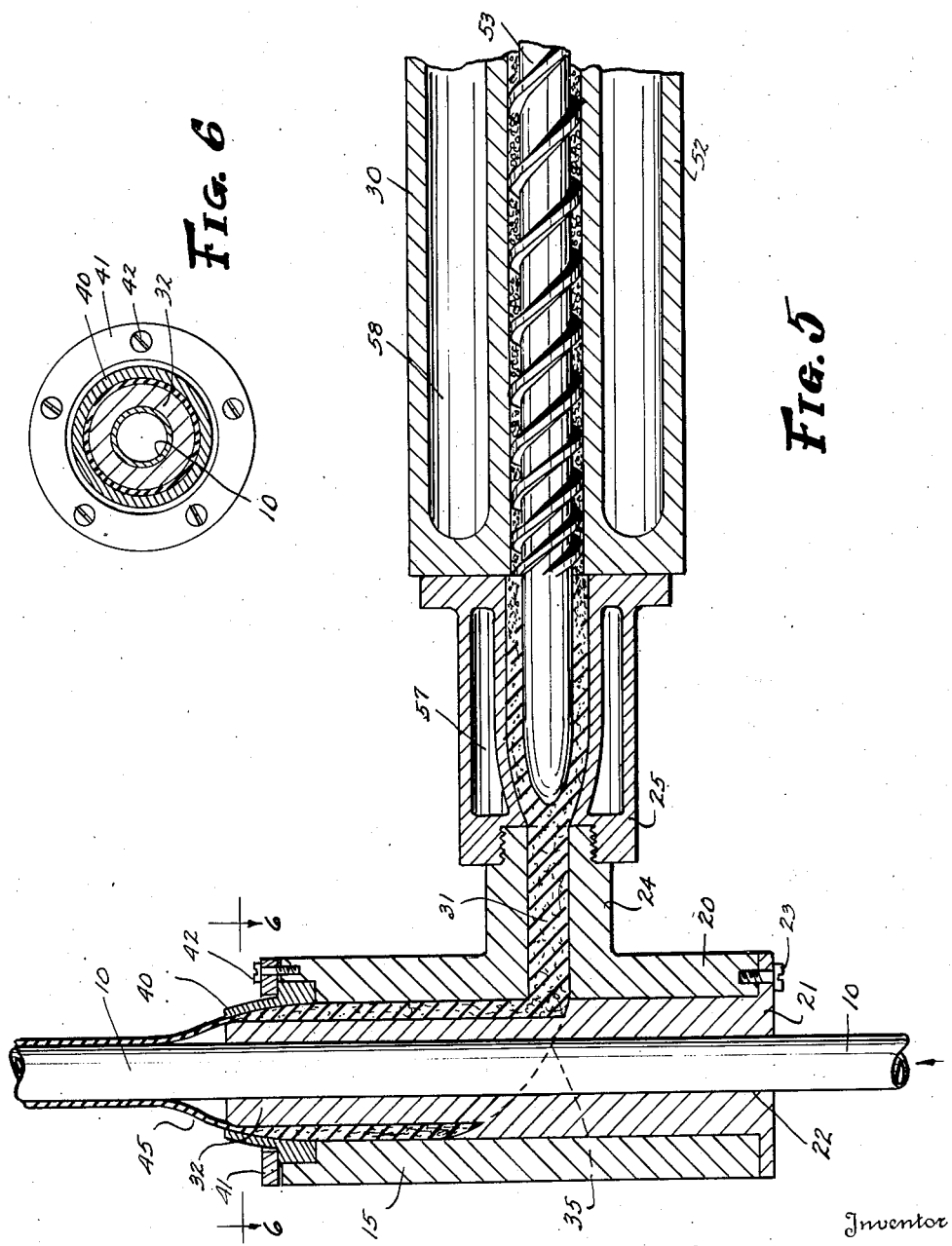
Inventor
ORAN C. WILSON 2nd
PHILIP S. BRITTON
By Bates, Teare, & McBean
Attorney

Patented Apr. 19, 1949

2,467,642

UNITED STATES PATENT OFFICE 2,467,642

METHOD FOR COATING ARTICLES WITH PLASTIC MATERIAL

Oran C. Wilson, Lakewood, and Philip S. Britton, Bratenahl, Ohio, assignors, by mesne assignments, to Samuel Moore & Company, Mantua, Ohio, a corporation of Ohio Application April 12, 1945, Serial No. 587,990

1 Claim. (Cl. 18—55)

This invention relates to a method for applying a coating of plastic material continuously to an article such as a tube or bar that is used for example, as a stanchion or supporting rod in various forms of transportation vehicles.

Heretofore stanchions, supporting bars and the like, have been coated with paint or baked enamel, but such material has been objectionable in that it has had a tendency to wear quickly, and has had a high degree of heat conductivity as a result of which it would feel unduly cold when grasped by the passengers. An effort has been made to apply a coating of plastic material, such as cellulose acetate, as by a dipping process, but this has been unsatisfactory because the thickness of the material could not be controlled, and because an adequate bond between the article and coating material could not be obtained.

An object of the present invention is to provide a method by means of which the plastic material may be applied to an article by an extrusion process in a continuous manner, and by means of which the coating may be applied in a stretched condition so as to make a firm bond to the article, and so as to have a uniform degree of thickness throughout the length thereof.

In the drawings, Fig. 1 is a top plan view of an apparatus for carrying out the present invention; Fig. 2 is an end view of the equipment shown in Fig. 1; Figs. 3 and 4 are sections taken on planes indicated by the correspondingly numbered lines in Fig. 1; Fig. 5 is a horizontal section taken on a plane indicated by the line 5—5 in Fig. 2 but on a scale larger than that shown in Fig. 2, and Fig. 6 is a section taken on a plane indicated by the line 6—6 in Fig. 5.

The article with which we have shown the application of a coating of plastic material comprises sections of metallic tubing 10 which are adapted to be positioned upon a table 11 having rollers 12 journalled therein for end to end feeding into a forming die, indicated at 15, from which the sections with the plastic material in tubular form thereon emerges and is supported upon rollers 16 that are journalled in a table 17.

In Fig. 5 the forming die is illustrated as comprising a head in the form of a casing 20 which has a passageway extending therethrough for receiving a sleeve 21, which has a bore 22 extending longitudinally therethrough, and which is adapted to be fastened at one end to the head by fastening members 23. The head has a laterally extending shank 24 which may be threaded to engage a nozzle 25 on an extruding machine, indicated in general at 30, and the shank has a passageway 31 therein through which the plastic material may flow from the nozzle. A passageway for the material through the head is provided by making a reduced portion 32 on the sleeve and utilizing the space between it and the head for guiding the material in a direction extending longitudinally of the sleeve. The reduced portion of the sleeve, therefore, is arranged to start adjacent the passageway 31 and in the preferred arrangement, the reduced portion 32 is joined to the main portion of the sleeve by a curved wall 35 which operates to assure a smooth flow of the plastic material, while at the same time to change the direction of travel thereof within the head.

To give the plastic material a tubular shape, we utilize a nozzle in the form of an annular member 40 which may be clamped to the head by a ring 41, as by securing members 42, in such position that the cross sectional area of the tubular material is gradually reduced and is permitted to emerge from the head at about the same point as the article which is moving through the passageway 22. In addition, the cross sectional size of the plastic material at the point of emergence from the forming die is larger than the cross sectional size of the article to which it is being applied, thereby providing an unsupported region indicated at 45, that bridges the space between the end of the sleeve 21 and the point of contact with the article. Then, by causing the article to travel slightly faster than the rate at which the plastic material is flowing, the material is caused to stretch as it contacts the article, and for such purpose, the unsupported region 45 permits adequate stretching as the material is being applied continuously to the article.

The material hardens almost immediately upon being ejected from the die, so that the coated article may be moved continuously through the die. Then, by abutting the leading end of a succeeding article to the trailing end of the preceding one, and feeding them constantly, as for example by the operation of a feed roller 50 which may be driven by a suitable electric motor 51, a continuous application of plastic material can be maintained.

The extruding machine, heretofore indicated at 30, includes the customary nozzle 25, a body 52, a feed screw 53, a hopper 54, an electric motor 55, and reduction mechanism indicated in general at 56 for rotating the feed screw. Suitable chambers 57 and 58 are provided in the nozzle and body respectively for the reception of a heating medium, such as steam, that may be supplied from a steam generator 60.

The plastic material, usually in powdered or granular form is fed into the hopper and is then caused to travel lengthwise of the body and nozzle by rotation of the feed screw, during which time it is heated continuously until by the time it reaches the nozzle it has flow-like characteristics. Sufficient heat is applied to permit the material to retain such flow-like characteristics until it passes through the forming die and onto the article to which it is to be applied.

An advantage of the apparatus and process embodying the present invention is the fact that the plastic material can be applied in a continuous manner by an extruding process, that the material can be applied with a uniform degree of thickness, and with a uniform degree of stretch so as to make it adhere tenaciously to the article without the need for any subsequent treatment. By making the process continuous in operation, the material can be applied quickly, satisfactorily and in an economical manner.

We claim:

A method of coating a rigid section of tubing, rods, or the like, with a wear-resistant plastic material which when heated becomes flowable but when cooled becomes hard, comprising heating the material and extruding it in tubular form through a die, arranging sections of the tubing or rods in abutting end-to-end relationship, engaging them only on an uncoated portion and pushing them with an endwise movement only through the die and into the plastic tubing in concentric relation therewith and in the same general direction as the movement of plastic material, maintaining the tubes in end-to-end abutting engagement through the die, moving the tubing or rod at a rate faster than the flow of the plastic material, whereby the plastic material is set at the time of its application to the tubing or rod, and maintaining the tubing or rod in the same general direction of movement after it passes through the die until the plastic material is hardened.

ORAN C. WILSON.
PHILIP S. BRITTON.

REFERENCES CITED

The following references are of record in the file of this patent:

UNITED STATES PATENTS

| Number | Name | Date |
|---|---|---|
| 368,591 | Jones et al. | Aug. 23, 1887 |
| 862,475 | Haywood | Aug. 6, 1907 |
| 1,637,207 | Whitehouse | July 26, 1927 |
| 1,986,696 | Wilson | Jan. 1, 1935 |
| 1,992,678 | Studt et al. | Feb. 26, 1935 |
| 2,287,825 | Postlewaite | June 30, 1942 |
| 2,291,670 | Wiley et al. | Aug. 4, 1942 |
| 2,308,638 | Balthis et al. | Jan. 19, 1943 |